INVENTORS
GEORGE H. MULLER
DONALD G. WHEATLEY

BY
John R. Faulkner
Glenn S. Arendsen
ATTORNEYS

United States Patent Office 3,563,009
Patented Feb. 16, 1971

3,563,009
FLOATING TOP AIR CLEANER ASSEMBLY
Donald G. Wheatley, Livonia, and George H. Muller,
Ann Arbor, Mich., assignors to Ford Motor Company,
Dearborn, Mich., a corporation of Delaware
Filed Oct. 25, 1968, Ser. No. 770,474
Int. Cl. B01d 27/08
U.S. Cl. 55—510
6 Claims

ABSTRACT OF THE DISCLOSURE

The cover for an air cleaner assembly is made of a sheet metal peripheral portion that clamps the air cleaner element onto the body and a convex center portion that ducts air from the filter element to the carburetor inlet. An annular resilient member connects the center portion to the peripheral portion and permits limited resilient or floating movement of the center portion relative to the body.

SUMMARY OF THE INVENTION

Air cleaners for removing particles from the air entering the carburetors of internal combustion engines traditionally have been made entirely of sheet metal or rigid polymeric materials such as phenolic resins. During vehicle operation, the internal combustion engine moves relative to the vehicle body because of the reaction to the engine generated torque, engine vibration, and road disturbances. Contact between the rigid air cleaner assembly and the vehicle hood must be avoided since such contact could damage the air cleaner body and cover, disturb fuel delivery through the sensitive carburetor fuel jets and passages, transmit engine noise and vibration to the hood, dent the vehicle hood or crack the carburetor housing.

Because of these severe consequences, vehicle designers have provided sufficient clearance to avoid contact between the air cleaner and the vehicle hood during all phases of vehicle assembly and operation including the surprisingly severe conditions encountered when the hood is closed. The necessity of such clearance has limited introduction of new design concepts involving lower vehicle hood lines.

This invention provides an air cleaner assembly capable of absorbing occasional contacts between the air cleaner assembly and the vehicle hood and thereby permitting significant reductions in the design clearance between the air cleaner and the hood. Many of the components in the assembly of this invention are similar to those of a standard air cleaner assembly so the difficulties of changing over mass production assembly equipment is minimized. The air cleaner assembly of this invention has a relatively rigid body with a filter element therein and a cover mounted thereon. The cover comprises a relatively rigid center portion having an essentially convex shape. A resilient member positioned between the center portion and the body permits limited resilient or floating movement of the center portion into the body in response to an exterior force such as contact between the cover and the vehicle hood.

In a construction preferred because of the ease with which present production equipment can be converted, the air cleaner cover is made up of the center portion and a peripheral portion that holds the filter element in place. An annular polymeric member having an H-shaped cross section connects the center portion to the peripheral portion. A spring normally urges the center portion away from the body and a button of an antistick material such as polytetrafluoroethylene is located at the highest point of the center portion to reduce forces generated during the occasional contact between the center portion and the vehicle hood.

DETAILED DESCRIPTION

Figure 1:
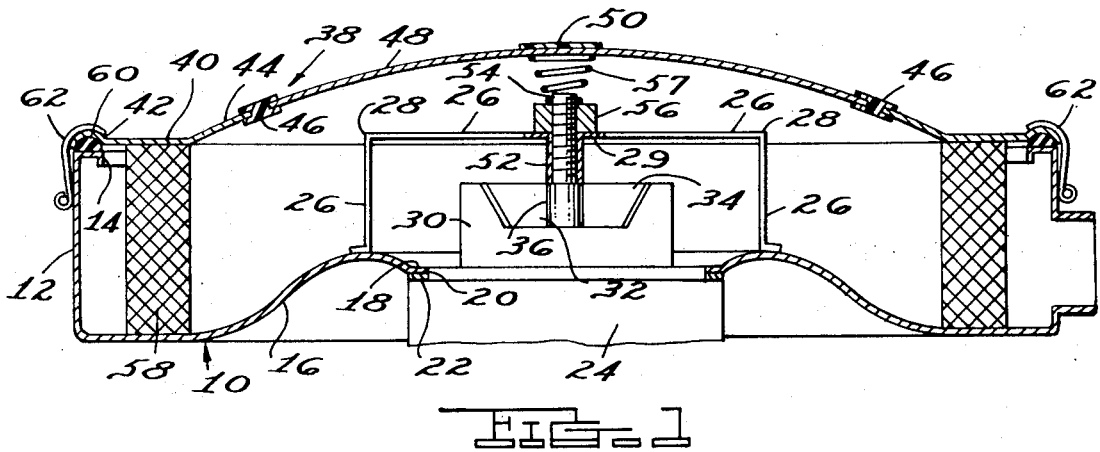
FIG. 1 is a sectioned elevation through an air cleaner assembly of this invention having the cover made of a center portion connected to a peripheral portion by a resilient member having an H-shaped cross section.

Referring to FIG. 1, the body of the air cleaner assembly of this invention is represented by numeral 10. Body 10 comprises a substantially cylindrical outer wall 12 that has an air opening (not shown) in at least one location. At its upper edge, wall 12 is folded inward to form a ledge 14. The floor of the body projects radially inward from wall 12 for a short distance and then curves upward in an extended S-curve 16 to a mounting ledge 18 defining a substantially circular opening 20. Ledge 18 seats on a gasket 22 positioned on a carburetor housing 24. Welded to the inside surface of the floor of body 10 are a plurality of upwardly projecting narrow ribs 26 that bend inward as at 28 and intersect each other at a center portion 29.

Carburetor housing 24 projects upward a short distance above the mounted location of ledge 18 in a thin walled inlet section designated by numeral 30. Inlet section 30 contains an inlet 32 that is low at its front and rises as it moves toward the center portion of the carburetor with a wall 34 defining the rearward portion thereof. A cylindrical boss 36 is formed in wall 34 and contains internal screw threads (not shown). The carburetor choke blade normally mounted in inlet section 30 has been removed from the figure for clarity.

The cover for the air cleaner assembly is indicated by numeral 38 and comprises a metal peripheral portion 40. Peripheral portion 40 has a channel 42 at its exterior edge and its interior edge bends upward as at 44 and fits between the lower legs of an annular member 46 having an H-shaped cross section. Member 46 is made of a resilient polymeric material such as rubber or polyurethane. A convex center member 48 has its edge fitting between the upper legs of member 46 and a wafer 50 of a nonsticking material such as polytetrafluoroethylene is bonded to the highest point of center member 48.

A spacer 52 is located between center portion 29 and the top of boss 36. Threaded into boss 36 is a stud 54 that projects above portion 29 for a short distance. A nut 56 is threaded onto stud 54 to mount body 10 on carburetor housing 24, and the smaller end of a helical spring 57 is located on the portion of stud 54 projecting above nut 56. In some cases, member 46 has sufficient resiliency to eliminate any need for spring 57.

Filter element 58 is placed on the floor of body 10. Element 58 can be made of any type of filtering material and preferably is the widely used pleated paper that flows air radially. A polymeric seal 60 is located in channel 42 and the cover assembly is mounted on body 10 with seal 60 bearing against edge 14, peripheral portion 40 bearing against filter element 58, and the larger end of spring 57 bearing against center member 48. Seal 60 preferably is bonded to the cover. Spring clips 62 fastened to the exterior of wall 12 are snapped over the ridge of channel 42 to clamp the cover assembly onto the body.

During engine operation, air drawn through filter element 58 passes between ribs 26 and enters inlet 32 of the carburetor. The axial ends of element 58 seal against the floor of body 10 and peripheral portion 40 so all air reaching the carburetor inlet passes through the filtering portion of the element. Peripheral portion 40 of the cover holds the air cleaner element firmly in place and spring 57 urges center member 48 upward to provide the area necessary for proper air flow. Any contact between the vehicle hood and the air cleaner assembly moves center member 48 vertically and/or laterally inward but member 46 deflects to absorb forces generated by the contact and prevent transmission of such forces to the carburetor housing. The crossbar of H shaped member 46 is sufficiently thick and resilient to absorb most lateral forces; wafer 50 by virtue of its low coefficient of friction reduces friction forces caused by any contact and thus assists in absorbing lateral forces.

Figure 2:
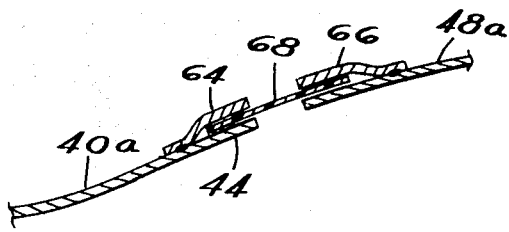
FIG. 2 is a partial section of an alternate construction in which a flat resilient member connects the peripheral portion to the center portion.

Turning to the alternate cover construction in FIG. 2, an annular lip 64 is welded to the inner edge 44 of peripheral portion 40a so the inner edge of lip 64 is spaced a short distance above inner edge 44. Similarly, the outer edge of center portion 48a has a lip 66 welded thereto. A flat annular member 68 has its outer edge positioned between lip 64 and inner edge 44 and its inner edge positioned between lip 66 and the outer edge of center member 48a so flat member 68 absorbs deflection of the center portion in the same manner as the H-shaped member 46 of FIG. 1.

Figure 3:
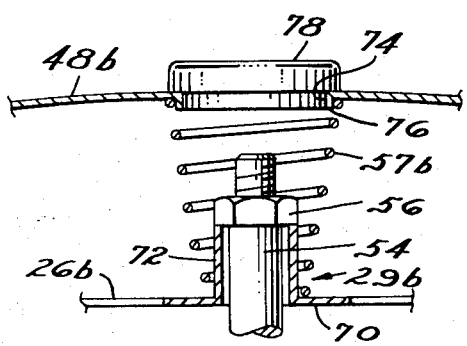
FIG. 3 is a detail of a modified construction of the center portion that uses a removable antistick button to provide access to the nut fastening the air cleaner assembly to the carburetor. The FIG. 3 construction permits removal and installation of the air cleaner body and cover as an assembly.

Referring to FIG. 3, center portion 29b is shaped like an inverted T with ribs 26b connected to the horizontal portion 70 and the vertical portion 72 surrounding stud 54. Nut 56 rests on the top of vertical portion 72 and holds the air cleaner body in place on the carburetor.

Center member 48b has an access hole 74 formed at its center and the metal surrounding hole 74 is depressed downward slightly to form a lip 76. Spring 57b has its smaller end positioned around vertical portion 72 and its larger end positioned around lip 76. A cap 78 has its smaller portion fitting into hole 74 and its larger top resting on the metal of center member 48b. Cap 78 can be removed readily from center member 48b and a socket wrench then can be inserted through hole 74 to remove nut 56, thereby permitting removal of the entire air cleaner assembly as a unit. By making cap 78 of an antisticking material, the cap also performs the function of wafer 50 of the FIG. 1 construction.

Thus this invention provides an air cleaner assembly capable of absorbing contact between the center member of the air cleaner and the vehicle hood. The cover of the air cleaner assembly rigidly clamps the air filter element onto the body of the assembly to prevent air leakage. In the preferred embodiment, the cover can be removed without disturbing the air cleaner body to service the air cleaner element or the entire assembly can be removed as a unit.

What is claimed is:

1. An air cleaner assembly for removing particles from the air entering the carburetor of an internal combustion engine, said assembly having a relatively rigid tray including an inlet for admitting air, a filter means for filtering the air, an outlet means for conducting the air to the engine and a cover mounted on said tray, said filter means being located between said inlet and said outlet means where the air travelling from said inlet to the outlet means passes through the filter means, said cover comprising a relatively rigid annular peripheral portion holding said filter means in place in said tray and a convex circular center portion extending to a greater height than said peripheral portion, and an annular resilient, polymeric member connecting the center portion to the peripheral portion, a spring positioned beneath said center portion, and said spring and said resilient polymeric member permitting limited resilient movement of the center portion into the tray, and means securing said cover to said tray.

2. The air cleaner assembly of claim 1 comprising a wafer of polytetrafluoroethylene at the highest point of the cover center portion, said wafer reducing lateral forces caused by contact of said wafer with a vehicle hood.

3. The air cleaner of claim 1 comprising spring means for urging the center portion away from the body.

4. The air cleaner assembly of claim 1 comprising a fastening means located below the center portion for fastening said body to said carburetor, said center portion having an opening directly above said fastening means, and a removable cap fitting in said opening, said cap being made of a nonsticking material.

5. The air cleaner assembly of claim 1 in which the resilient member is a polymeric seal having an H-shaped cross section with the legs on one side of the crossbar fitting on each side of the center portion and the legs on the other side of the crossbar fitting on each side of the peripheral portion.

6. The air cleaner assembly of claim 5 comprising a wafer of polytetrafluoroethylene at the highest point of the cover center portion, said wafer reducing lateral forces caused by contact of said wafer with a vehicle hood.

References Cited

UNITED STATES PATENTS

| 1,215,974 | 2/1917 | Orem | 55—510 |
| 2,189,138 | 2/1940 | Eichner | 220—BS |
| 2,907,612 | 10/1959 | White | 161—42 |
| 2,996,145 | 8/1961 | Thornburgh | 55—498 |
| 3,055,536 | 9/1962 | Dieng | 220—44 |
| 3,160,488 | 12/1964 | Wilber | 55—507 |
| 3,462,037 | 8/1969 | Keller | 220—44 |
| 2,871,842 | 2/1959 | Dolza | 123—119 |
| 3,473,301 | 10/1969 | Buckman | 55—510 |

FOREIGN PATENTS

| 799,118 | 6/1958 | Great Britain | 55—276 |
| 558,893 | 3/1957 | Italy | 55—510 |

FRANK W. LUTTER, Primary Examiner

B. NOZICK, Assistant Examiner